July 29, 1924.
R. R. SHAFFER ET AL
FLOAT VALVE
Filed Jan. 30, 1923
1,503,433
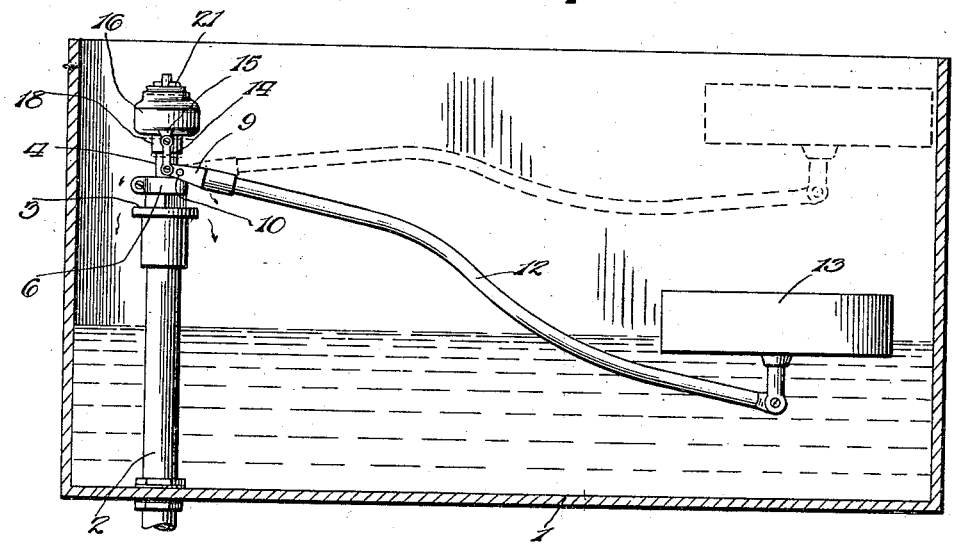
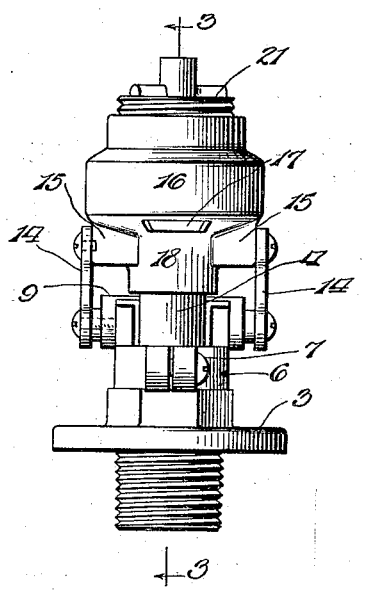
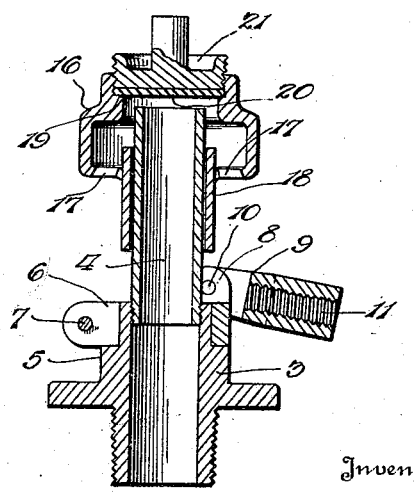
Inventors
R. R. Shaffer
J. F. Shaffer
By Lacey & Lacey, Attorneys Patented July 29, 1924.

1,503,433

UNITED STATES PATENT OFFICE.

ROBERT R. SHAFFER AND JAMES F. SHAFFER, OF CRAWFORDSVILLE, IOWA.

FLOAT VALVE.

Application filed January 30, 1923. Serial No. 615,891.

*To all whom it may concern:*

Be it known that we, ROBERT R. SHAFFER and JAMES F. SHAFFER, citizens of the United States, residing at Crawfordsville, in the county of Washington and State of Iowa, have invented certain new and useful Improvements in Float Valves, of which the following is a specification.

Our invention relates to float valves for stock-watering and other tanks, and has for its object the provision of an automatically operated valve whereby the flow of water into the tank will be controlled by the level of the water therein. One object of the invention is to provide a valve of such construction that its parts may be readily separated if it should get out of order, and another object of the invention is to provide a valve of such simple construction that it is not apt to get out of order. Other incidental objects of the invention will appear in the course of the following description.

In the accompanying drawing:

Figure 1 is an elevation of our improved valve showing the same in position within a tank;

Fig. 2 is an enlarged elevation of the valve viewed at a right angle to Fig. 1, and Fig. 3 is a vertical section of the valve taken on the line 3—3 of Fig. 2.

The tank 1 may be of any desired form and dimensions. It may also be constructed of any preferred material and will, of course, be water-tight. Through the bottom of the tank extends a water supply pipe 2 and at the upper end of the said pipe is fitted thereto a nozzle 3, in the upper extremity of which is secured a nipple 4 which projects vertically from the nozzle and the discharge from which is controlled by our improved valve. The upper extremity of the nozzle 3 is reduced so as to provide an annular shoulder 5 and, resting on said shoulder, a clamp collar 6 is secured about the end of the nozzle. This clamp collar is so disposed about the nozzle that its split is located at the side more remote from the center of the tank and a clamping screw or bolt 7 is inserted through the split ends, as will be readily understood. At the opposite side of the nozzle, lugs 8 are provided upon the upper edge of the collar, and a fork 9 is arranged to span the said lugs and the nipple 4 and is pivoted to the lugs by cap screws 10, as will be readily understood. The stem of the fork 9 is provided with a threaded bore 11, in which is received one end of the float lever 12 which extends from the fork into the tank and carries a float 13 at its free end so that the lever and the fork 9 will be rocked about the pivots 10 as the float rises or falls with the level of the water in the tank. Pivotally attached to the ends of the fork 9 are the lower ends of links 14 which have their upper ends pivotally mounted on bosses 15 disposed at diametrically opposite points of the valve cap 16. The said cap 16 is constructed with an annularly enlarged body portion having outlet openings 17 in its under side and a central tubular stem 18 which fits closely but slidably about the nipple 4. The upper side or end of the cap 16 has an internal diameter greater than the external diameter of the nipple 4 and is constructed with an internal annular shoulder 19 upon which rests a gasket or washer 20 adapted to extend across and rest upon the upper end of the nipple 4 in the closed position of the valve so as to effectually close the nipple, as will be understood on reference to Fig. 3. A plug 21 is threaded into the upper end of the cap 16 and clamps the said washer or gasket upon the shoulder 19 so that it will be held firmly in place and will positively engage and close the upper end of the nipple when the level of the water in the tank reaches the desired height.

When the tank is filled, the float 13 is in an upper position and the float lever 12 is in the position indicated by dotted lines in Fig. 1, the fork 19 being thereby disposed so that the ends thereof are below the pivots and the links 14 are consequently drawn downwardly. In this position, the cap will be held against the end of the nipple 4 with the washer or gasket 20 resting thereon and the inflow of water will be positively arrested. As the water is used, the float will, of course, descend and the float lever will consequently be rocked so that an upward movement will be imparted to the links 14 through the fork 9 and consequently the cap will be lifted from the end of the nipple, the water then being permitted to rise through the nipple and overflow the upper end thereof to escape through the discharge opening 17 in the bottom of the cap and so pass into the tank.

It will be readily noted that we have provided a valve of very simple construction and any one part may be repaired or replaced without requiring replacement of any other part. Most of the wear, if not all of the wear, is obviously upon the gasket or washer 20. In order to replace this gasket, it is necessary merely to cut off the flow of water at the controlling valve which may be disposed at any convenient point between the nozzle 3 and the point of supply, after which the plug 21 is withdrawn from the cap, the worn out washer taken out and a new washer placed therein upon the shoulder 19. The plug 21 is then returned to its place and the water again turned on. The pivotal connections are preferably all cap screws so that they may be readily withdrawn when any one part needs replacement and the entire valve may be removed from the supply pipe by merely withdrawing the clamping screw 7 and then lifting the collar 6 and the other elements as an entirety from the nozzle. The links 14 are disposed at diametrically opposite sides of the inlet nipple and are pivotally attached to the cap at points connected by a line passing through the axis of the cap and the nipple so that the movement of the cap upon the nipple will be rectilinear and lateral movement will be prevented so that bending of the parts will be avoided. This result is further insured by the provision of the tubular stem 18 which constitutes a guide for the movement of the cap upon the nipple, as will be clear from the drawing.

It is to be understood that the float lever may be a straight rod, although we have, for convenience in the present instance, illustrated it as bent into ogee form. Other minor details may be changed at will without involving any departure from the spirit or scope of the invention as the same is defined in the following claim.

Having thus described the invention, what is claimed as new is:

The combination of a water supply element terminating with a nipple, a cap having an annular chamber surrounding the discharge end of said nipple provided with a central opening at the top and discharge openings in its bottom, a sleeve integral with said cap extending downwardly therefrom and slidably engaging said nipple, an annular shoulder around said top opening, a gasket fitting said top opening and seated on said shoulder, a plug threaded in said cap and adapted to secure said gasket, a lever having a forked end spanning and fulcrumed upon the water supply element, a float carried by the opposite end of the lever, and links pivoted respectively to the forked end of the lever and to said cap at diametrically opposite points on the same, said gasket being adapted to close the opening of the nipple upon said lever being operated.

In testimony whereof we affix our signatures.

ROBERT R. SHAFFER. [L. S.]
JAMES F. SHAFFER. [L. S.]